United States Patent
Alves

(10) Patent No.: US 8,020,042 B2
(45) Date of Patent: Sep. 13, 2011

(54) SYSTEM AND METHOD FOR SUPPORTING COMPENSATION WORK

(75) Inventor: Alexandre de Castro Alves, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 12/898,523

(22) Filed: Oct. 5, 2010

(65) Prior Publication Data

US 2011/0029811 A1    Feb. 3, 2011

Related U.S. Application Data

(63) Continuation of application No. 11/410,586, filed on Apr. 25, 2006, now Pat. No. 7,818,618.

(51) Int. Cl.
*G06F 11/00*    (2006.01)

(52) U.S. Cl. ......................................................... 714/16

(58) Field of Classification Search .................... 714/13, 714/15–17, 21, 22, 37–39, 48
See application file for complete search history.

(56) References Cited

U.S. PATENT DOCUMENTS

| | | | | |
|---|---|---|---|---|
| 5,870,545 | A * | 2/1999 | Davis et al. | 709/201 |
| 6,625,602 | B1 * | 9/2003 | Meredith et al. | 707/703 |
| 2001/0021915 | A1 * | 9/2001 | Cohen et al. | 705/14 |
| 2004/0073483 | A1 * | 4/2004 | Cohen et al. | 705/14 |
| 2005/0091075 | A1 * | 4/2005 | Cohen et al. | 705/1 |
| 2006/0085243 | A1 * | 4/2006 | Cooper et al. | 705/8 |
| 2007/0203772 | A1 * | 8/2007 | Eun et al. | 705/8 |

* cited by examiner

*Primary Examiner* — Nadeem Iqbal
(74) *Attorney, Agent, or Firm* — Fliesler Meyer LLP

(57) ABSTRACT

A method for supporting compensation work comprises the steps of associating a data structure with a compensation function, and associating the data structure with the at least one event that can be encountered during execution of a forward work. The data structure contains a pair of pointers, which includes a first pointer to a code to be executed for the compensation function, and a second pointer to a stack frame of a closest lexically enclosing scope of a declaration of the compensation function in a computer program text.

17 Claims, 5 Drawing Sheets

SYSTEM AND METHOD FOR SUPPORTING COMPENSATION WORK

CLAIM TO PRIORITY

This application is a continuation of U.S. patent application Ser. No. 11/410,586 entitled "SYSTEM AND METHOD FOR PERFORMING COMPENSATION WORK" filed Apr. 25, 2006, now U.S. Pat. No. 7,818,618 issued Oct. 19, 2010, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to performing compensation work, and more particularly to a mechanism for supporting compensation work.

BACKGROUND OF THE INVENTION

A business process is a conceptualization that unites a set of services into a logical unit or view of a service. The interacting services of the business process may be defined using a variety of mechanisms, such as Web Service Definition Language (WSDL) for example. Each service corresponds to a partner of the work flow, or service linkage, that is being defined by the business process. The business process is made of activities or rules, which transform and route messages. The transformation may be specified using so called "plugged-in" languages, such as XPath and Java™, for example. (Java™ is a trademark of Sun Microsystems, Inc.) The business process paradigm shifts from a conventional perspective of considering an object state or its internal composition as most significant to emphasis on the object's noticeable behavior to other objects.

The Organization for the Advancement of Structured Information Standards (OASIS) has defined a specification for a programming language, the Business Process Definition Language (BPEL), to orchestrate execution of activities that comprise business processes. However, conventional error recovery mechanisms under the BPEL definition are ad-hoc and require copying of information from the work being carried out to the error recover routine.

What is needed is an improved mechanism for performing compensation work.

SUMMARY OF THE INVENTION

In one embodiment of the present invention, a method for supporting compensation work comprises the steps of associating a data structure with a compensation function, and associating the data structure with the at least one event that can be encountered during execution of a forward work. The data structure contains a pair of pointers, which includes a first pointer to a code to be executed for the compensation function, and a second pointer to a stack frame of a closest lexically enclosing scope of a declaration of the compensation function in a computer program text.

DETAILED DESCRIPTION

Figure 1A:
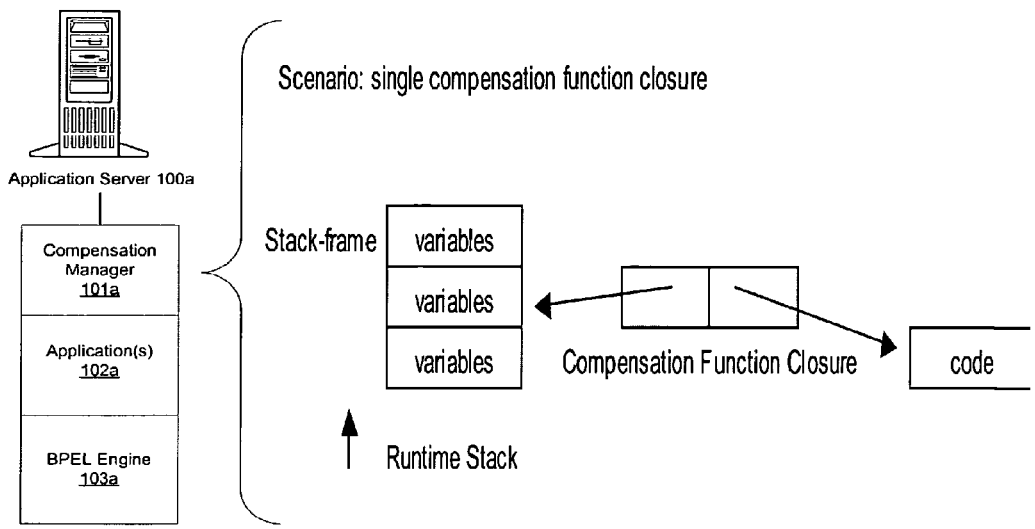
FIGS. 1A-1B are functional block diagrams of example techniques for performing compensation work in an embodiment.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for performing compensation work. These mechanisms and methods can enable embodiments to provide design patterns for implementing compensation work. The ability of embodiments to provide design patterns for implementing compensation work can provide consistency of long-running business processes defined using means of some programming language or modeling tool. Further, embodiments can enable compensation functions implementing compensation work to be efficiently persisted and to be passed as arguments to other program components.

In an embodiment, a method for performing compensation work is provided. One method embodiment includes receiving a definition of at least one compensation function as a closure data structure. The compensation function implements compensation work for at least one event that can be encountered during execution of forward work. During execution of forward work, an event triggering the at least one compensation work is detected. A process state is retrieved. The process state associated with the compensation function based upon the closure. The process state contains data needed to execute compensating work at a different runtime than the runtime of execution of the forward work.

Consistency of long-running business processes may be achieved by defining, using means of some programming language or modeling tool, compensating work for the forward work in case of failures or exceptions. Compensating work is realized by compensation functions. As used herein, the term compensation function is intended to mean a function that makes use of a process state that contains data needed to execute compensating work at a different runtime than that of execution of forward work. Process execution engine embodiments can dynamically manage process state to make the state available to compensation functions. As used herein, the term closure refers to a data structure that holds an expression and an environment of variable bindings in which that expression is to be evaluated. The variables may be local or global. Closures are used to represent expressions and their evaluation environment when implementing programming languages with lazy evaluation. In a real implementation, both expression and environment are represented by pointers. As used herein, the term stack frame is defined as a memory record in the runtime stack of a programming language execution environment that contains space for variables declared in a computer program's scope.

FIG. 1A is functional block diagram of an example computing environment in which techniques for performing compensation work in an embodiment may be implemented. As shown in FIG. 1A, a computing environment 10 includes a server 100a that provides a mechanism in which one or more applications 102 can execute using resources available on the application server 100a. In one embodiment, the application server 100a utilize an application server product, such as WebLogic® Server by BEA systems of San Jose, Calif.

The server 100a may run Java or other programming language environment configured to provide access to resources internal to the server, as well as resources reachable by the server 100a (not shown in FIG. 1A for clarity), such as databases, peripherals, networks and the like. Embodiments of server 100a can be configured from a variety of hardware and software. In one embodiment, the server 100a includes a compensation function manager 101a embodiment that controls performing compensation work. A BPELJ engine 103a implements the OASIS BPEL 2.0 (to be released) specification and the joint BEA and IBM BPELJ White Paper. The BPELJ engine 103a allows for orchestration of Web Services, enterprise integration of services, and message (data) manipulation. In particular, BPELJ engine 103a allows for data manipulation using Xpath 1.0, Xquery, and Java.

In an embodiment, an application server's compensation manager 101a applies a single compensation function closure data structure. The closure data structure includes definitions for compensation functions that implement compensation work for at least one event that can be encountered during execution of forward work. In one closure data structure embodiment, the data structure comprises: (1) a pointer to the compensation function's code to be executed; and (2) a pointer to stack frame of closest lexically enclosing scope of the compensation function's declaration in the computer program's text. Embodiments allow the closure data structure to be associated with the at least one event that can be encountered during execution of forward work. When, during execution of forward work, an event triggering the at least one compensation work is detected, a process state associated with the compensation function is retrieved based upon the closure. The process state contains data needed to execute compensating work at a different runtime than the runtime of execution of the forward work. Retrieval can include retrieval of data and/or code. Events triggering compensation work can include events initiated by users, such as an event indicating that the user desires that the forward work be undone, as well as events initiated by machines, such as events indicating that an error has occurred that requires that the forward work be undone.

Figure 1B:
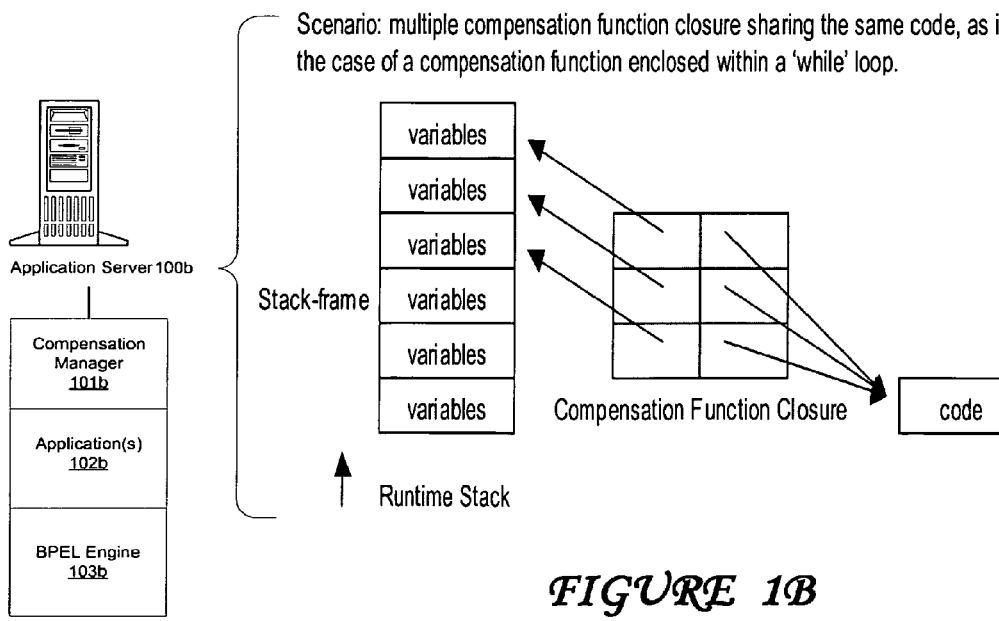

As illustrated by FIG. 1B, an application server's compensation manager 101b can employ a closure data structure with multiple compensation functions that share the same code. For example, in the context of executing a compensation function enclosed within a "while" loop, the same code would be executed for different contexts, each context having different values for variables stored in a stack frame.

While the present invention is described with reference to an embodiment in which performing compensation work that are executable programs written in the Java™ programming language and usually (though not always) executed in response to an invocation from an HTML page, the present invention is not limited to the Java™ programming language and may be practiced using other programming languages, i.e., JSP and the like without departing from the scope of the embodiments claimed. (Java™ is a trademark of Sun Microsystems, Inc.) In one embodiment, the server X utilizes an application server product, such as WebLogic® Server by BEA systems of San Jose, Calif. A method embodiment for protecting the internal classes will be described with reference to FIGS. 2A-2E.

Figure 2A:
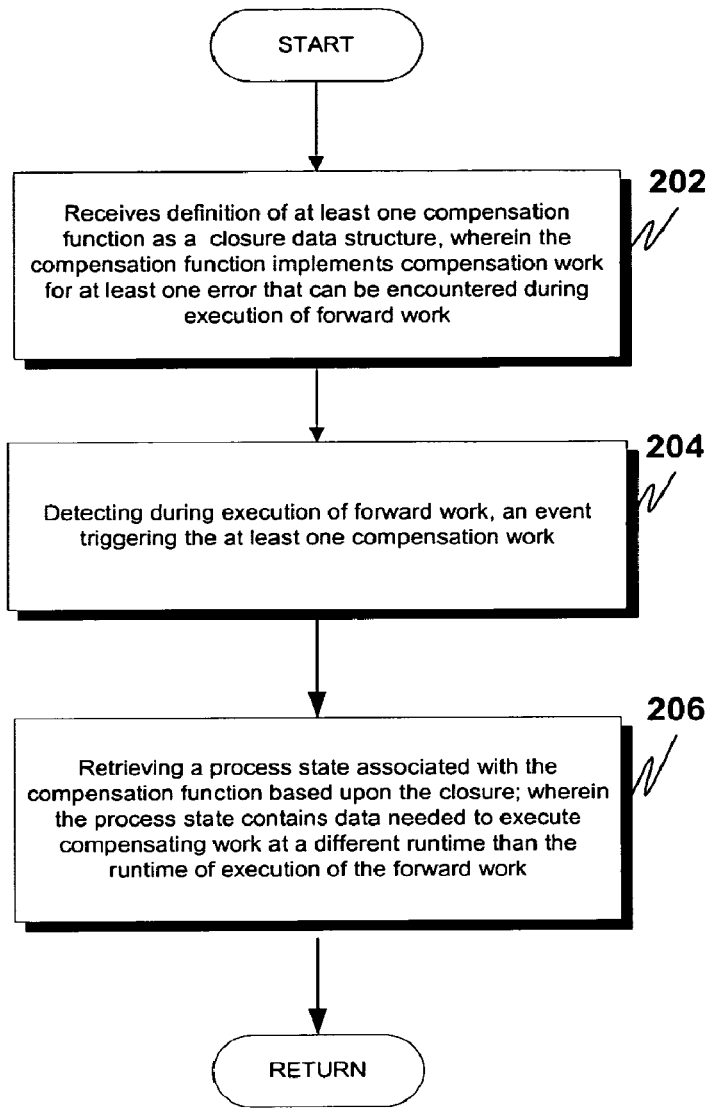
FIGS. 2A-2E are operational flow diagrams illustrating a high level overview of a techniques for performing compensation work in an embodiment.

FIG. 2A is an operational flow diagram illustrating a high level overview of a technique for performing compensation work in an embodiment. The technique for performing compensation work shown in FIG. 2A is operable with an application performing compensation work, such as application 101a of FIG. 1A and application 101b of FIG. 1B, for example. As shown in FIG. 2A, in a method for performing compensation work, a definition of at least one compensation function as a closure data structure is received. The compensation function implements compensation work for at least one event that can be encountered during execution of forward work (block 202). During execution of forward work, an event triggering the at least one compensation work is detected (block 204). A process state associated with the compensation function is retrieved based upon the closure (block 206). The process state contains data needed to execute compensating work at a different runtime than the runtime of execution of the forward work.

Figure 2B:
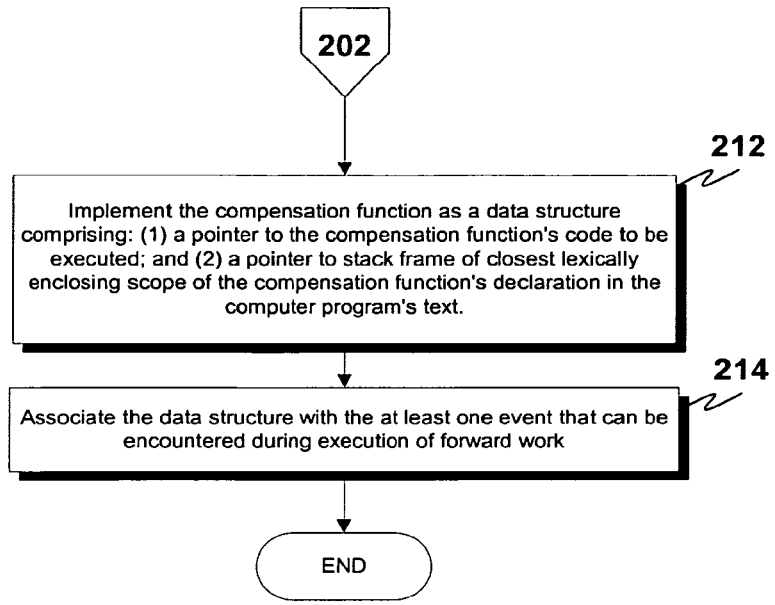

FIG. 2B is an operational flow diagram illustrating a high level overview of receiving a definition of at least one compensation function as a closure data structure in an embodiment. As shown in FIG. 2B, receiving a definition of at least one compensation function as a closure data structure includes implementing the compensation function as a data structure (block 212). The data structure comprises: (1) a pointer to the compensation function's code to be executed; and (2) a pointer to stack frame of closest lexically enclosing scope of the compensation function's declaration in the computer program's text. The data structure is associated (block 214) with the at least one event that can be encountered during execution of forward work.

Figure 2C:
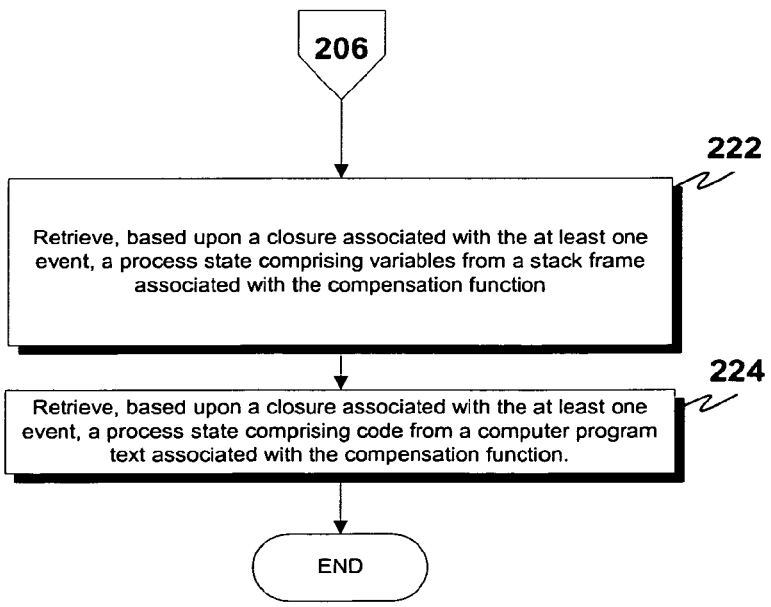

FIG. 2C is an operational flow diagram illustrating a high level overview of retrieving a process state associated with the compensation function based upon the closure in an embodiment. As shown in FIG. 2C, retrieving a process state associated with the compensation function based upon the closure includes retrieving (block 222), based upon a closure associated with the at least one event, a process state comprising variables from a stack frame associated with the compensation function. Code from a computer program text associated with the compensation function is also retrieved (block 224), based upon the closure associated with the at least one event.

Figure 2D:
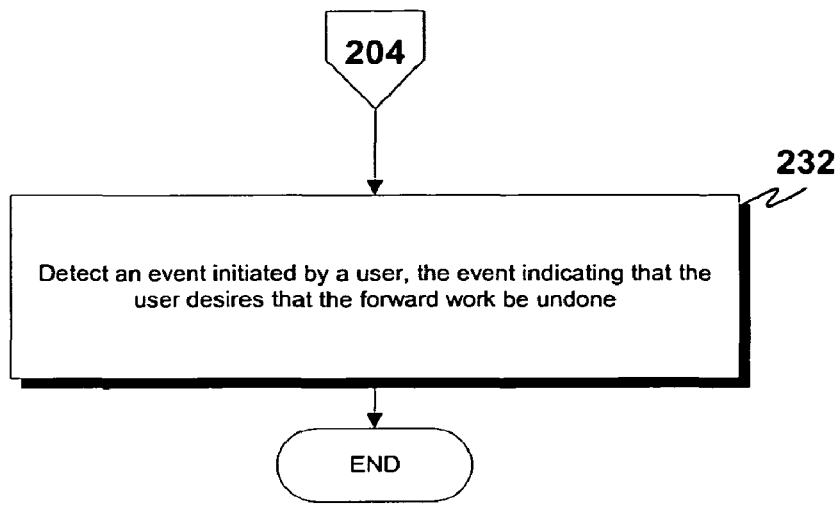

FIG. 2D is an operational flow diagram illustrating a high level overview of detecting an event triggering the at least one compensation work during execution of forward work in an embodiment. As shown in FIG. 2D, detecting an event triggering the at least one compensation work includes detecting an event initiated by a user (block 232). The event indicates that the user desires that the forward work be undone.

Figure 2E:
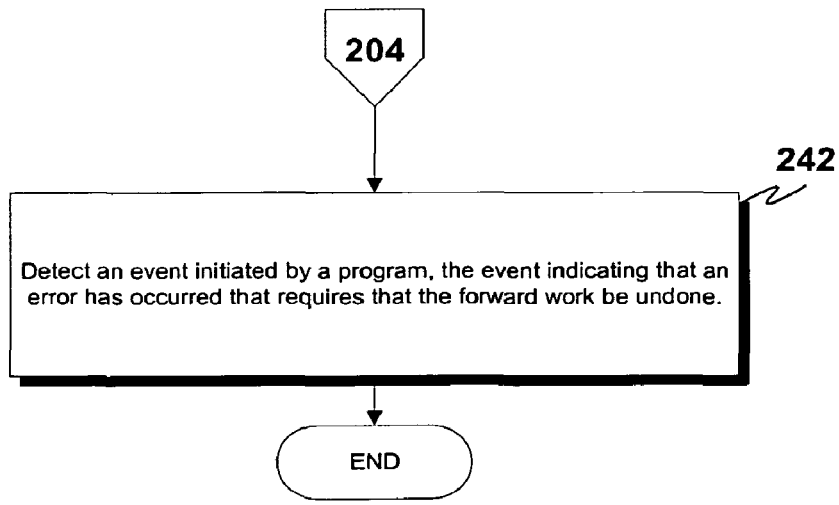

FIG. 2E is an operational flow diagram illustrating a high level overview of detecting an event triggering the at least one compensation work during execution of forward work in an embodiment. As shown in FIG. 2E, detecting an event triggering the at least one compensation work includes detecting an event initiated by a program (block 242). The event indicates that an error has occurred that requires that the forward work be undone.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for performing compensation work as discussed herein.

Figure 3:
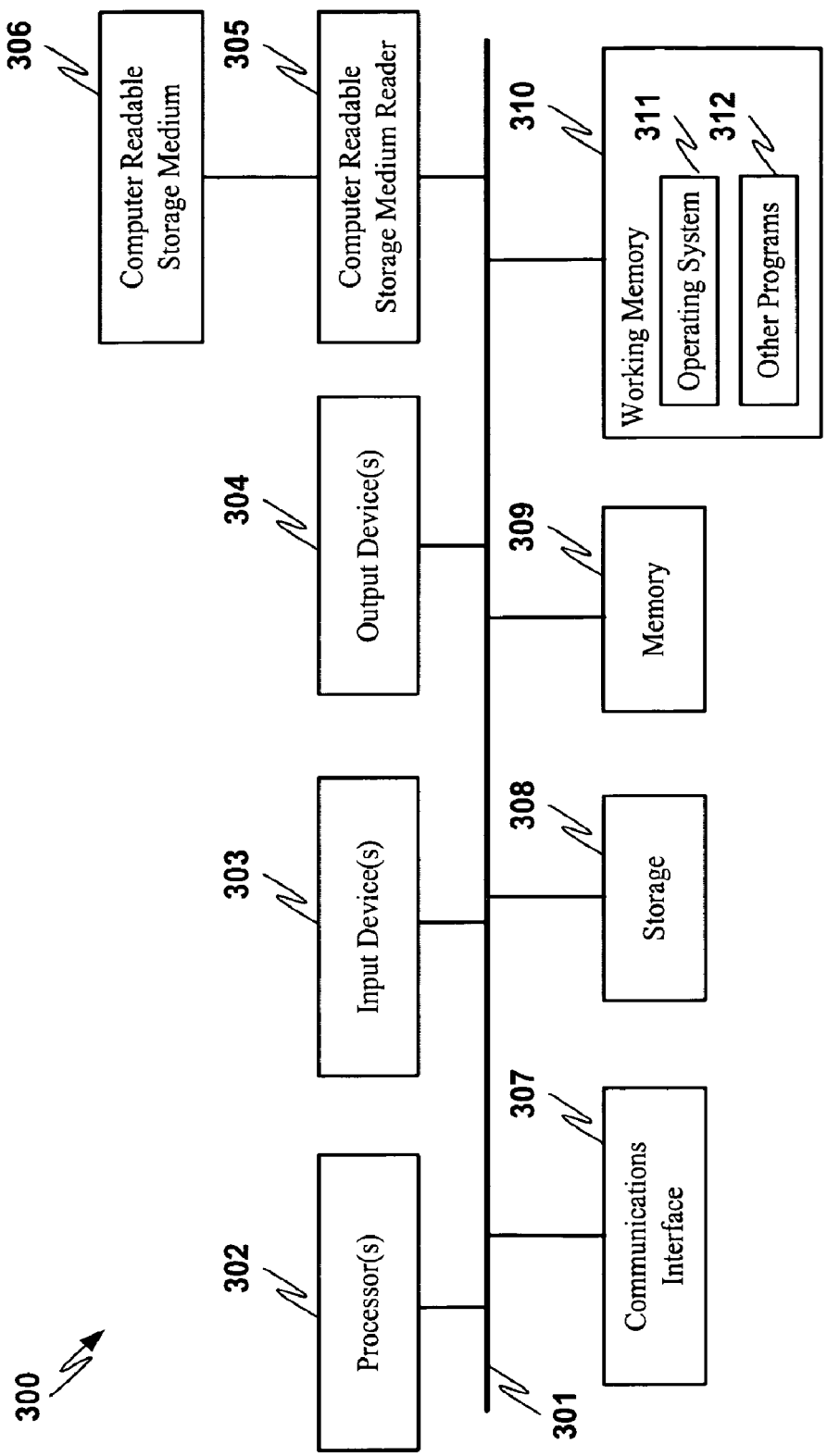
FIG. 3 is a hardware block diagram of an example computer system, which may be used to embody one or more components in an embodiment.

FIG. 3 illustrates an exemplary processing system 300, which can comprise one or more of the elements of FIGS. 1A and 1B. Turning now to FIG. 3, an exemplary computing system is illustrated that may comprise one or more of the components of FIGS. 1A and 1B. While other alternatives might be utilized, it will be presumed for clarity sake that components of the systems of FIGS. 1A and 1B are implemented in hardware, software or some combination by one or more computing systems consistent therewith, unless otherwise indicated.

Computing system 300 comprises components coupled via one or more communication channels (e.g., bus 301) including one or more general or special purpose processors 302, such as a Pentium®, Centrino®, Power PC®, digital signal processor ("DSP"), and so on. System 300 components also include one or more input devices 303 (such as a mouse, keyboard, microphone, pen, and so on), and one or more output devices 304, such as a suitable display, speakers, actuators, and so on, in accordance with a particular application. (It will be appreciated that input or output devices can also similarly include more specialized devices or hardware/software device enhancements suitable for use by the mentally or physically challenged.)

System 300 also includes a machine readable storage media reader 305 coupled to a machine readable storage medium 306, such as a storage/memory device or hard or removable storage/memory media; such devices or media are further indicated separately as storage 308 and memory 309, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 307 may also be included, such as a modem, DSL, infrared, RF or other suitable transceiver, and so on for providing inter-device communication directly or via one or more suitable private or public networks or other components that may include but are not limited to those already discussed.

Working memory 310 further includes operating system ("OS") 311 elements and other programs 312, such as one or more of application programs, mobile code, data, and so on for implementing system 300 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 312 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 308 or memory 309) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for supporting compensation work, the method comprising:
   providing a data structure associated with a compensation function, wherein the data structure contains a pair of pointers, which includes a first pointer to a code to be executed for the compensation function, and a second pointer to a stack frame of a closest lexically enclosing scope of a declaration of the compensation function in a computer program text; and
   executing the compensation function based on the data structure on one or more microprocessors, when at least one event is encountered during execution of a forward work.

2. The method of claim 1, further comprising:
   allowing the data structure to contain another pair of pointers, which includes a first pointer to another compensation function's code to be executed, and a second pointer to stack frame that points to a closest lexically enclosing scope of the another compensation function's declaration in the computer program text, wherein the another compensation function shares a same code with the compensation function.

3. The method of claim 1, further comprising:
   performing compensation work using the compensation function based upon a current state of the forward work that is to be undone at a different runtime than a runtime of execution of the forward work.

4. The method of claim 1, further comprising:
   receiving an indication that at least one activity in a set of activities of forward work is to be undone by performing compensation work.

5. The method of claim 4, further comprising:
   detecting an event initiated by a user, the event indicating that the user desires that the forward work be undone.

6. The method of claim 4, further comprising:
   detecting an event initiated by a program, the event indicating that an error has occurred that requires that the forward work be undone.

7. The method of claim 1, further comprising:
   retrieving a process state associated with the compensation function based upon the data structure, the process state includes variables from the stack frame associated with the compensation function.

8. The method of claim 1, further comprising:
   retrieving a process state associated with the compensation function based upon the data structure, the process state includes code from a computer program text associated with the compensation function.

9. A machine-readable storage medium carrying one or more sequences of instructions for supporting compensation work, which instructions, when executed by one or more processors, cause the one or more processors to carry out the steps of:
   providing a data structure associated with a compensation function, wherein the data structure contains a pair of pointers, which includes a first pointer to a code to be executed for the compensation function, and a second pointer to a stack frame of a closest lexically enclosing scope of a declaration of the compensation function in a computer program text; and
   executing the compensation function based on the data structure, when at least one event is encountered during execution of a forward work.

10. The machine-readable medium as recited in claim 9, further comprising instructions for carrying out the step of:
    allowing the data structure to contain another pair of pointers, which includes a first pointer to another compensation function's code to be executed, and a second pointer to stack frame that points to a stack frame of a closest lexically enclosing scope of a declaration of the another compensation function in a computer program text, wherein the another compensation function shares a same code with the compensation function.

11. The machine-readable medium as recited in claim 9, further comprising instructions for carrying out the step of:
    performing compensation work using the compensation function based upon a current state of the forward work that is to be undone at a different runtime than a runtime of execution of the forward work.

12. The machine-readable medium as recited in claim 9, further comprising instructions for carrying out the step of:
    receiving an indication that at least one activity in a set of activities of forward work is to be undone by performing compensation work.

13. The machine-readable medium as recited in claim 9, further comprising instructions for carrying out the step of:
    detecting an event initiated by a user, the event indicating that the user desires that the forward work be undone.

14. The machine-readable medium as recited in claim 9, further comprising instructions for carrying out the step of:
    detecting an event initiated by a program, the event indicating that an error has occurred that requires that the forward work be undone.

15. The machine-readable medium as recited in claim 9, further comprising instructions for carrying out the step of:
    retrieving a process state associated with the compensation function based upon the data structure, the process state includes variables from the stack frame associated with the compensation function.

16. The machine-readable medium as recited in claim 9, further comprising instructions for carrying out the step of:
    retrieving a process state associated with the compensation function based upon the data structure, the process state includes code from a computer program text associated with the compensation function.

17. An apparatus for performing compensation work, the apparatus comprising:
    a processor; and
    one or more stored sequences of instructions which, when executed by the processor, cause the processor to carry out the steps of:
      associating a data structure with a compensation function, wherein the data structure contains a pair of pointers, which includes a first pointer to a code to be executed for the compensation function, and a second pointer to a stack frame of a closest lexically enclosing scope of a declaration of the compensation function in a computer program text; and
      associating the data structure with the at least one event that can be encountered during execution of a forward work.

* * * * *